(12) United States Patent
Lauder

(10) Patent No.: US 10,077,108 B2
(45) Date of Patent: Sep. 18, 2018

(54) VERTICAL TAKE-OFF AND LANDING (VTOL) AIRCRAFT WITH EXHAUST DEFLECTOR

(71) Applicant: Sikorsky Aircraft Corporation, Stratford, CT (US)

(72) Inventor: Timothy Fred Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 99 days.

(21) Appl. No.: 14/987,295

(22) Filed: Jan. 4, 2016

(65) Prior Publication Data
US 2017/0183091 A1    Jun. 29, 2017

Related U.S. Application Data

(60) Provisional application No. 62/127,046, filed on Mar. 2, 2015.

(51) Int. Cl.
*B64C 29/02* (2006.01)
*B64C 9/38* (2006.01)
*B64D 29/02* (2006.01)
*B64C 23/06* (2006.01)

(52) U.S. Cl.
CPC ............... *B64C 29/02* (2013.01); *B64C 9/38* (2013.01); *B64C 23/069* (2017.05); *B64D 29/02* (2013.01); *Y02T 50/164* (2013.01)

(58) Field of Classification Search
CPC .......... B64C 29/02; B64C 23/065; B64C 9/38; B64D 29/02
See application file for complete search history.

(56) References Cited

U.S. PATENT DOCUMENTS

| | | | | |
|---|---|---|---|---|
| 2,799,989 A * | 7/1957 | Kappus | ...................... | B64C 9/38 239/265.35 |
| 2,968,149 A * | 1/1961 | Graham | ..................... | B64C 9/38 239/455 |
| 4,116,405 A * | 9/1978 | Bacchi | ................ | B64C 29/0075 244/12.4 |
| 5,687,907 A | 11/1997 | Holden | | |
| 6,622,472 B2 | 9/2003 | Plumpe, Jr. | | |
| 7,364,115 B2 | 4/2008 | Parks et al. | | |
| 7,988,087 B1 | 8/2011 | Tonks et al. | | |
| 2011/0315809 A1* | 12/2011 | Oliver | ................. | B64C 29/0033 244/12.4 |

* cited by examiner

*Primary Examiner* — Valentina Xavier
(74) *Attorney, Agent, or Firm* — Cantor Colburn LLP

(57) ABSTRACT

A vertical take-off and landing (VTOL) aircraft is provided and includes a fuselage with first and second wings extending outwardly from opposite sides of the fuselage, nacelles with proprotors respectively disposed on the first and second wings, the proprotors being rotatable to generate lift in vertical flight and thrust in horizontal flight and exhaust deflectors disposed proximate to trailing ends of the nacelles. The exhaust deflectors are disposed to assume at least first, second and third configurations respectively associated with first, second and third flight conditions.

15 Claims, 4 Drawing Sheets

VERTICAL TAKE-OFF AND LANDING (VTOL) AIRCRAFT WITH EXHAUST DEFLECTOR

FEDERAL RESEARCH STATEMENT

This invention was made with government support under DARPA CONTRACT NO. DARPA-BAA-13-19 awarded by DARPA's Tactical Technology Office (TTO). The government has certain rights in this invention.

CROSS REFERENCE TO RELATED APPLICATION

This application is a non-provisional application of U.S. provisional application No. 62/127,046, which was filed on Mar. 2, 2015. The entire disclosures of U.S. provisional application No. 62/127,046 are incorporated herein by reference.

BACKGROUND OF THE INVENTION

The subject matter disclosed herein relates to vertical take-off and landing (VTOL) aircraft and, more particularly, to a VTOL aircraft with an exhaust deflector.

A vertical take-off and landing (VTOL) aircraft is one that can fly horizontally and one that can hover, take off, and land vertically. This classification includes fixed-wing aircraft as well as helicopters and other aircraft with powered rotors, such as cyclogyros/cyclocopters and tiltrotors. Some VTOL aircraft can operate in other modes as well, such as conventional take-off and landing (CTOL), short take-off and landing (STOL) and short take-off and vertical landing (STOVL). Others, such as some helicopters, can only operate by VTOL, due to the aircraft lacking landing gear that can handle horizontal motion.

For those VTOL aircraft that take off and land as rotorcraft and fly as fixed wing aircraft, engines are often aligned with longitudinal axes of the wings for horizontal (or forward) flight. In rotorcraft mode where the engine is oriented vertically, this configuration restriction places the engine exhaust in close proximity to the ground and may result in thermal impingement of the ground surface and local aircraft structures.

BRIEF DESCRIPTION OF THE INVENTION

According to one aspect of the invention, a vertical take-off and landing (VTOL) aircraft is provided and includes a fuselage with first and second wings extending outwardly from opposite sides of the fuselage, nacelles with proprotors respectively disposed on the first and second wings, the proprotors being rotatable to generate lift in vertical flight and thrust in horizontal flight and exhaust deflectors disposed proximate to trailing ends of the nacelles. The exhaust deflectors are disposed to assume at least first, second and third configurations respectively associated with first, second and third flight conditions.

According to additional or alternative embodiments, the aircraft further includes alighting elements disposed to support the aircraft in a ground operation condition.

According to additional or alternative embodiments, the first and second wings respectively include first and second wing portions extending outwardly from the opposite sides of the fuselage and first and second swept winglets extending outwardly from and forming obtuse angles with the first and second wing portions.

According to additional or alternative embodiments, the nacelles each include primary exhaust ducts at the trailing ends thereof and the exhaust deflectors include hinges disposed at trailing edges of each of the primary exhaust ducts and first and second deflector flaps coupled to each of the primary exhaust ducts via the hinges such that the first and second deflector flaps are pivotable about the trailing edges of the primary exhaust ducts.

According to additional or alternative embodiments, the first and second deflector flaps are disposed in parallel.

According to additional or alternative embodiments, the first and second deflector flaps are independently pivotable.

According to additional or alternative embodiments, the first and second deflector flaps each include a Coanda deflector.

According to additional or alternative embodiments, the first flight condition includes ground operations, the second flight condition includes vertical take-off, hover and landing operations and the third flight condition includes high speed flight, and the first configuration includes a deflecting configuration, the second configuration includes a divergent-to-neutral configuration and the third configuration includes a neutral-to-convergent configuration.

According to another aspect of the invention, a vertical take-off and landing (VTOL) aircraft is provided and includes a fuselage with first and second wings extending outwardly from opposite sides of the fuselage, nacelles with proprotors respectively disposed on the first and second wings, the proprotors being rotatable to generate lift in vertical flight and thrust in horizontal flight, exhaust deflectors disposed proximate to trailing ends of the nacelles and a control system coupled to the exhaust deflectors and configured to control the exhaust deflectors to assume at least first, second and third configurations respectively associated with first, second and third flight conditions.

According to additional or alternative embodiments, the aircraft further includes alighting elements disposed to support the aircraft in a ground operation condition.

According to additional or alternative embodiments, the first and second wings respectively include first and second wing portions extending outwardly from the opposite sides of the fuselage and first and second swept winglets extending outwardly from and forming obtuse angles with respective distal tips of the first and second wing portions.

According to additional or alternative embodiments, the nacelles each include primary exhaust ducts at the trailing ends thereof and the exhaust deflectors include hinges disposed at trailing edges of each of the primary exhaust ducts and first and second deflector flaps coupled to each of the primary exhaust ducts via the hinges such that the first and second deflector flaps are independently pivotable about the trailing edges of the primary exhaust ducts.

According to additional or alternative embodiments, the first and second deflector flaps are disposed in parallel.

According to additional or alternative embodiments, the first and second deflector flaps each include a Coanda deflector.

According to additional or alternative embodiments, the first flight condition includes ground operations, the second flight condition includes vertical take-off, hover and landing operations and the third flight condition includes high speed flight, and the first configuration includes a deflecting configuration, the second configuration includes a divergent-to-neutral configuration and the third configuration includes a neutral-to-convergent configuration These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a vertical take-off and landing (VTOL) aircraft is provided with an engine exhaust deflector and augmented with a Coanda Deflector. This exhaust system will be utilized to divert (vector) engine exhaust in a direction more aligned with the ground surface and includes a primary duct to transform the engine exhaust from its original cylindrical shape to a more ribbon-like shape, multiple adjustable deflectors to redirect the exhaust and can be supplemented with Coanda deflectors to provide for additional exhaust re-direction. To further reduce engine exhaust impingement, those components normally in the exhaust path for a VTOL aircraft are relocated by removal of the nacelle-mounted upper vertical fin and landing gear, and replacement of these features with structure incorporated in the first and second swept winglets.

Figure 1:
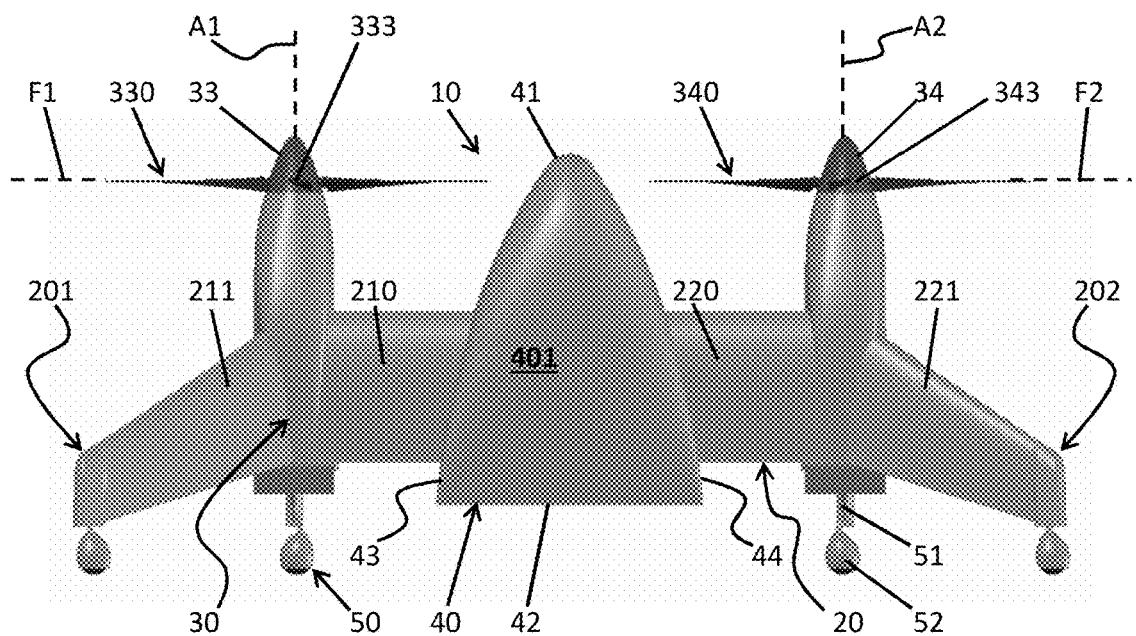
FIG. 1 is an elevational view of a vertical take-off and landing (VTOL) aircraft in a grounded condition in accordance with embodiments.
Figure 2:
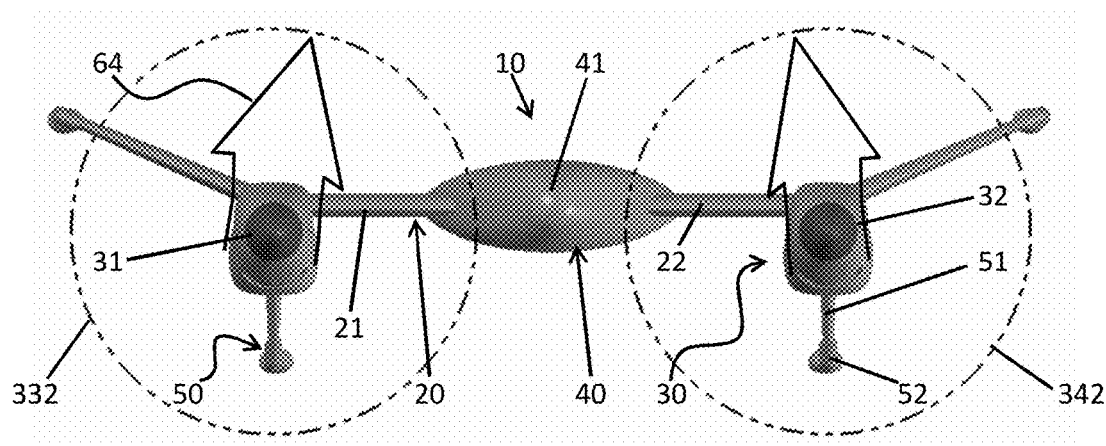
FIG. 2 is a plan view of the VTOL aircraft in the ground operation condition.
Figure 3:
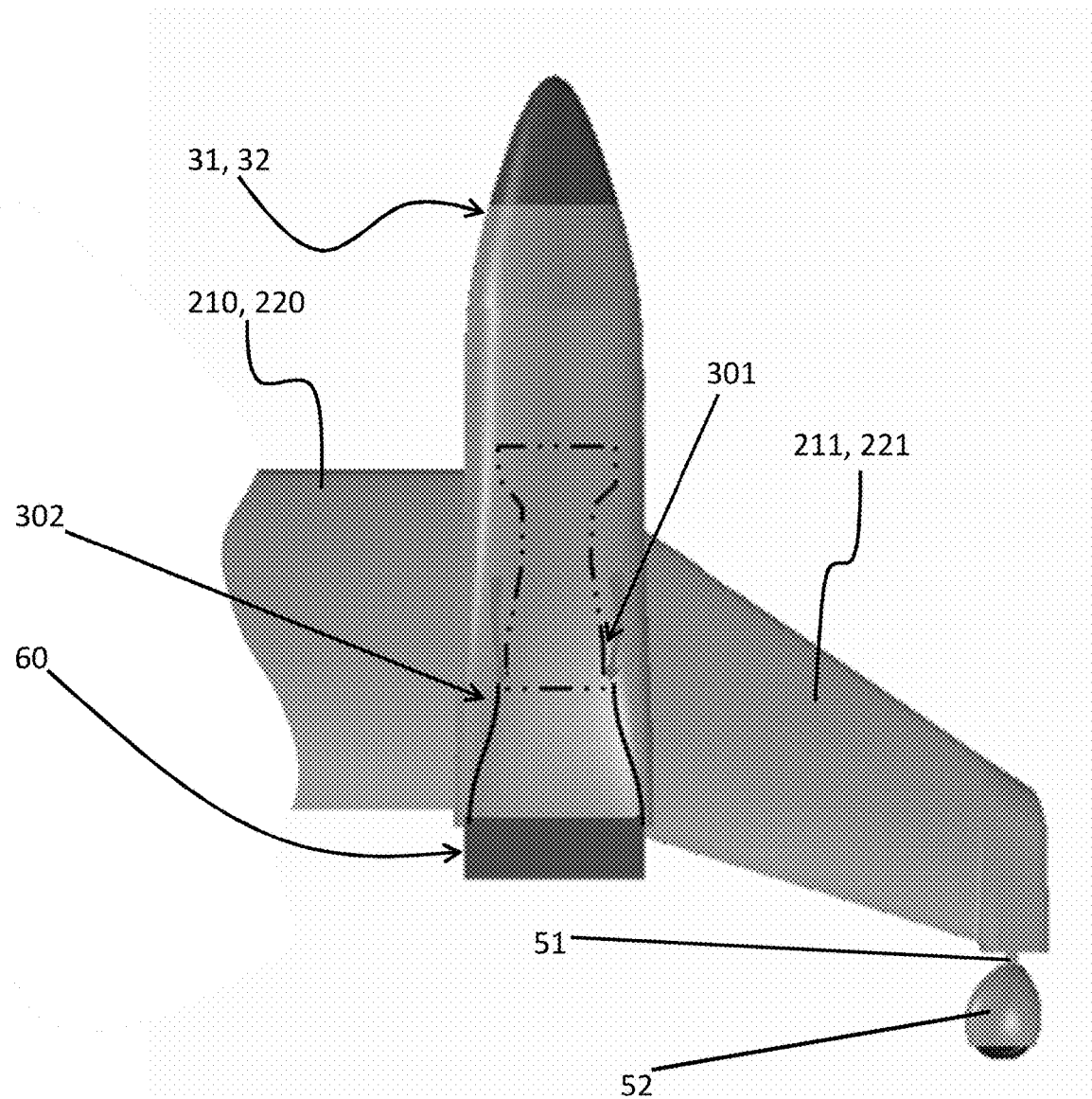
FIG. 3 is a schematic illustration of exhaust deflectors for the aircraft of FIGS. 1 and 2 in accordance with embodiments.

With reference to FIGS. 1 and 2, a vertical take-off and landing (VTOL) aircraft 10 is provided. The aircraft 10 includes a wing structure 20, nacelles 30, a fuselage 40 and alighting elements 50. The fuselage 40 includes a nose portion 41, which may be aerodynamically rounded to reduce drag effects, a trailing edge portion 42, a first side 43 and a second side 44 opposite the first side 43. The wing structure 20 includes a first wing 21 extending outwardly from the first side 43 and a second wing 22 extending outwardly from the second side 44. The alighting elements 50 include landing gear struts 51 and alighting elements 52. The landing gear struts 51 attach to distal tips of the first and second wings 21 and 22 and extend away from respective planes of the wing structure 20. The landing gear struts 51 support the alighting features 52, such as landing gear. The alighting features 52 are coupled to distal ends of the landing gear struts 51 and, in a ground operational condition, the aircraft 10 sits on the alighting features 52 with the nose portion 41 pointing upwardly.

During take-off, hover (or loiter) and landing, the aircraft 10 maintains a vertical orientation but, as flight operations transition to horizontal flight, the nose portion 41 turns over and the wing structure 20 becomes more parallel with the horizon.

The first wing 21 includes a first wing portion 210 extending outwardly from the first side 43 of the fuselage 40 in a first direction and a first swept winglet 211. The first swept winglet 211 extends outwardly from around a distal tip of the first wing portion 210 at a first end 201 of the wing structure 20 and forms an obtuse angle with the first wing portion 210 in a dihedral arrangement (see FIG. 2). The second wing 22 includes a second wing portion 220 extending outwardly from the second side 44 of the fuselage 40 in a second direction, which is opposite the first direction, and a second swept winglet 221. The second swept winglet 221 extends outwardly from around a distal tip of the second wing portion 220 at a second end 202 of the wing structure 20 and forms an obtuse angle with the second wing portion 220 in a dihedral arrangement (see FIG. 2). The landing gear struts 51 may be attached to distal tips of the first and second swept winglets 211 and 221.

The nacelles 30 include at least a first nacelle 31 and a second nacelle 32. The first nacelle 31 is disposed at the distal tip of the first wing portion 210 and the second nacelle 32 is disposed at the distal tip of the second wing portion 220. The first nacelle 31 is supportive of a first proprotor 33, which has proprotor blades 330 that are configured to be driven to rotate about rotational axis A1 to generate lift and thrust for the aircraft 10 in vertical flight and to generate thrust and rotor control for the aircraft 10 in horizontal flight. The second nacelle 32 is supportive of a second proprotor 34, which has proprotor blades 340 that are configured to be driven to rotate about rotational axis A2 to generate lift and thrust for the aircraft 10 in vertical flight and to generate thrust and rotor control for the aircraft 10 in horizontal flight.

The first and second proprotors 33 and 34 each include a hub 333 and 343 disposed at a forward end of the corresponding one of the first and second nacelles 31 and 32 and proprotor blades 330 and 340 extending outwardly from the respective hubs 333 and 343. The proprotors 33 and 34 are drivable by at least one motive power generating unit, which may be housed in at least one or both of the first nacelle 31 and the second nacelle 32 and/or the fuselage 40, such that the proprotor blades 330 and 340 rotate about the rotational axes A1 and A2 to define rotor disks 332 and 342 (see FIG. 2).

The motive power generating unit may be embodied as a gas turbine engine, an electrical motor-generator or a gas-electric hybrid engine. In cases where the first and second proprotors 33 and 34 are remote from their respective motive power generating unit (e.g., the case where the motive power generating unit is a single gas turbine engine housed in only the first nacelle 31), the aircraft 10 may further include a transmission unit with a drive shaft extending from the first nacelle 31 to the second nacelle 32.

In addition to being rotatable about the rotational axes A1 and A2, the proprotor blades 330 and 340 may also be pivotable relative to the feather axes F1 and F2. This pivoting permits navigational and flight control of the aircraft 10 and causes the rotor disks 332 and 342 to be pivotable about the respective hubs 333 and 343.

The driving of propeller rotations and pivots may be controlled by a flight computer that is at least partially housed on board the aircraft along with other electronic components and payload elements of the aircraft 10. These features may be housed within at least one or both of the first nacelle 31 and the second nacelle 32 and/or the fuselage 40.

The fuselage 40 may have various shapes and sizes such as a delta-wing shape or a barrel shape. In the former exemplary case, the fuselage 40 includes a delta-wing shaped body 401 and is disposed along the wing structure 20 between the nacelles 30 as described above. The delta-wing shaped body 401 may be formed to house components of at least one or more of a motive power generating unit, a flight computer and other aircraft components. In addition, embodiments exist in which the aircraft 10 is configured for manned flight in which case the delta-wing shaped body 401 is formed to define a cabin sized to accommodate a pilot and, in some cases, at least one or more crewmen or passengers. The volume of the delta-wing shaped body 401 is such that sufficient room may be provided for the features noted above while the features are located in or close to a center of gravity location.

The delta-wing shaped body 401 may have the (optionally) rounded nose portion 41 and the trailing edge portion 42 and widens in a plan-wise dimension (i.e., from the first side 43 to the second side 44) from the nose portion 41 toward the trailing edge portion 42. The delta-wing shaped body 401 may also flatten in cross-section from the nose portion 41 toward the trailing edge portion 42. With this general configuration, the delta-wing shaped body 401 maintains a lift inducing airfoil shaped profile with a blunt forward end at the nose portion 41 and a gradual tapering toward the trailing edge portion 42.

With reference to FIGS. 3-6, the aircraft 10 further includes exhaust deflectors 60. The exhaust deflectors 60 are disposed proximate to trailing ends of each of the first and second nacelles 31 and 32 and are further disposed to assume at least first, second and third configurations. These first, second and third configurations are respectively associated with first, second and third flight conditions. As will be described below, the first flight conditions relate to engine start and ground operations, the second flight conditions relate to vertical take-off, hover and landing operations as well as other low speed flight operations, including transition, and the third flight conditions relate to high speed flight operations.

The first and second nacelles 31 and 32 each include an engine bay 301 that is receptive of cooling air and primary exhaust ducts 302 downstream from the engine bay 301 at the trailing ends of the first and second nacelles 31 and 32. The primary exhaust ducts 302 are divergent in a wing plane and convergent in the wing section plane and thus condition circular shaped engine exhaust flows to assume a ribbon-like shape as they move through the space defined with the primary exhaust ducts 302. The exhaust deflectors 60 include hinges 61 and first and second deflector flaps 62. The hinges 61 are disposed at trailing edges of each of the primary exhaust ducts 302 and the first and second deflector flaps 62 are respectively coupled to each of the primary exhaust ducts 302 via the hinges 61. By way of such coupling, the first and second deflector flaps 62 are independently pivotable about the trailing edges of the primary exhaust ducts 302.

Figure 4:
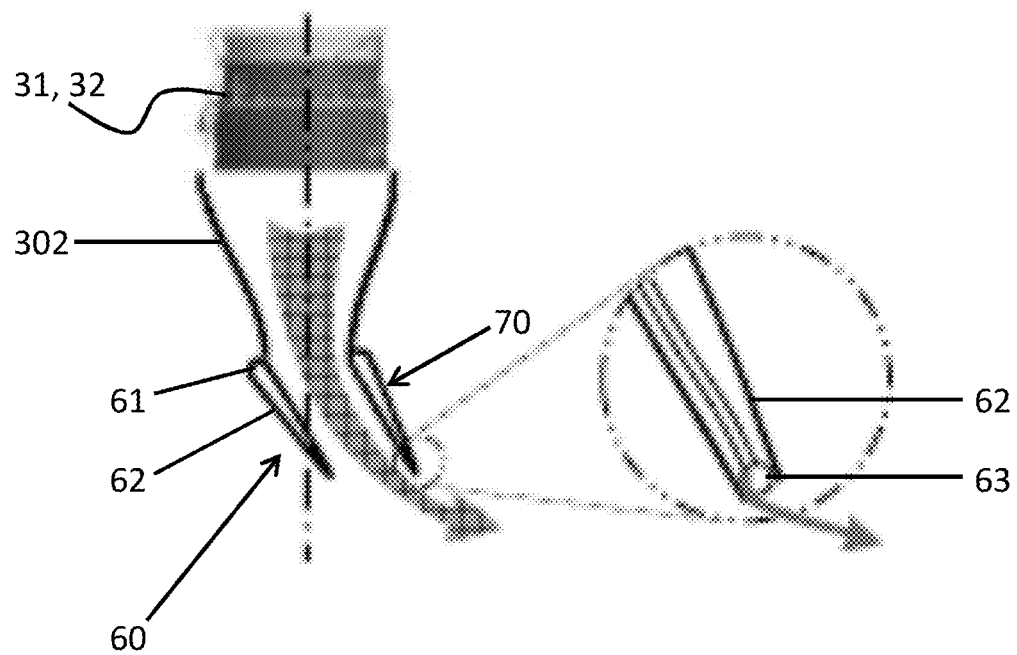
FIG. 4 is a side schematic view of deflector flaps in a first configuration.

The first and second deflector flaps 62 for each of the first and second nacelles 31 and 32 are disposable in parallel with one another although it is to be understood that the independent pivoting of each of the deflector flaps 62 permits non-parallel configurations as well. For example, in a case where the first flight conditions relate to engine start and ground operations currently in effect, the first and second deflector flaps 62 for each of the first and second nacelles 31 and 32 may assume a deflecting configuration 70 as shown in FIG. 4. This deflecting configuration 70 is characterized with both the first and second deflector flaps 62 being pivoted in a same direction to thereby deflect engine exhaust 64 in that direction (an exemplary direction is shown in FIG. 2, which illustrates that the direction can be but does not need to be perpendicular to the wing plane). Although the deflecting configuration 70 is illustrated in FIG. 4 with the first and second deflector flaps 62 disposed in parallel with one another, it is to be understood that this is merely exemplary and that the first and second deflector flaps 62 need not be parallel for the deflecting configuration 70 to have effect.

Figure 5:
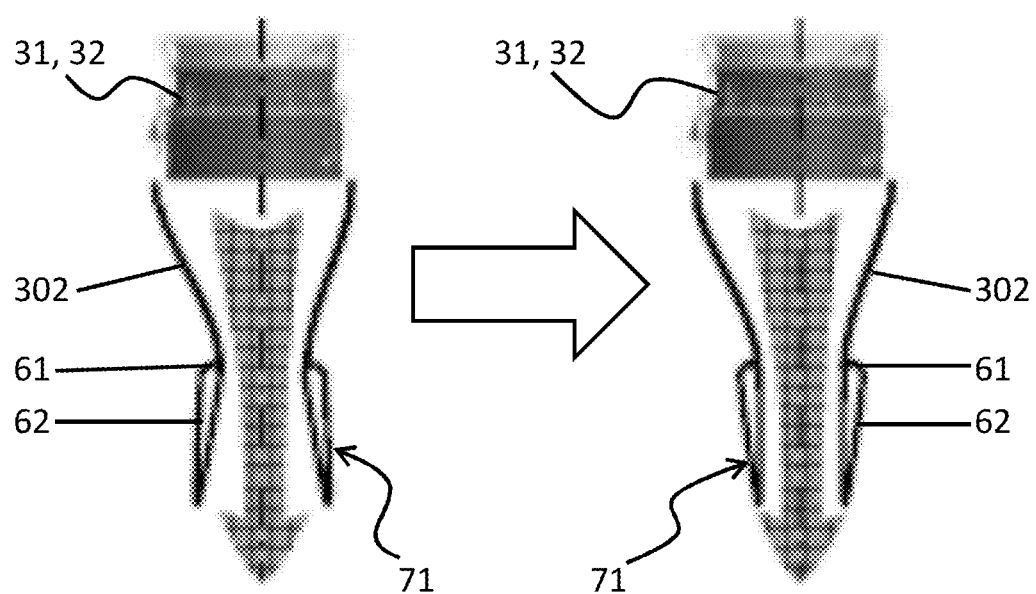
FIG. 5 is a side schematic view of deflector flaps in a second configuration.

As another example, in a case where the second flight conditions relate to vertical take-off, hover and landing operations as well as other low speed flight operations currently in effect, the first and second deflector flaps 62 for each of the first and second nacelles 31 and 32 may assume a divergent-to-neutral configuration 71 as shown in FIG. 5. This divergent-to-neutral configuration 71 is characterized with both the first and second deflector flaps 62 being pivoted away from one another or in parallel with one another at a zero angle relative to the wing plane to thereby maintain a straight and possibly diffusing engine exhaust pathway.

Figure 6:
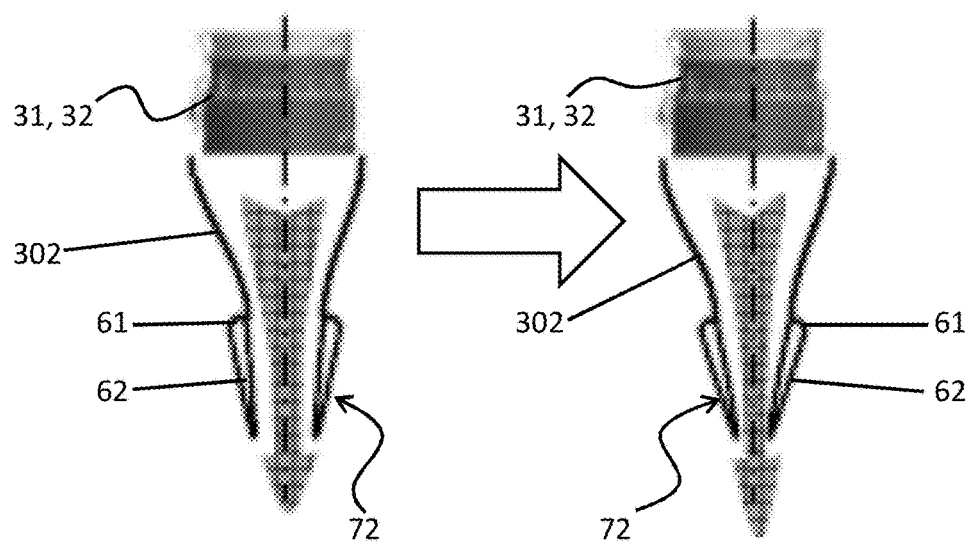
FIG. 6 is a side schematic view of deflector flaps in a third configuration.

As yet another example, in a case where the third flight conditions relate to high speed flight operations currently in effect, the first and second deflector flaps 62 for each of the first and second nacelles 31 and 32 may assume a neutral-to-convergent configuration 72 as shown in FIG. 6. This neutral-to-convergent configuration 72 is characterized with both the first and second deflector flaps 62 being in parallel with one another at a zero angle relative to the wing plane to being pivoted toward one another to thereby maintain a straight and possibly accelerating engine exhaust pathway.

As shown in FIG. 4, at least one or both of the first and second deflector flaps 62 for each of the first and second nacelles 31 and 32 may include a Coanda deflector 63. The Coanda deflector 63 is located at the distal end of the at least one or both of the first and second deflector flaps 62 for each of the first and second nacelles 31 and 32 and operates by expelling fluid such as engine bleed-air that is plumbed to the Coanda deflector 63. When in use, the Coanda deflector 63 provides for additional re-direction of the engine exhaust in accordance with the known properties and characteristics of the Coanda effect.

Figure 7:
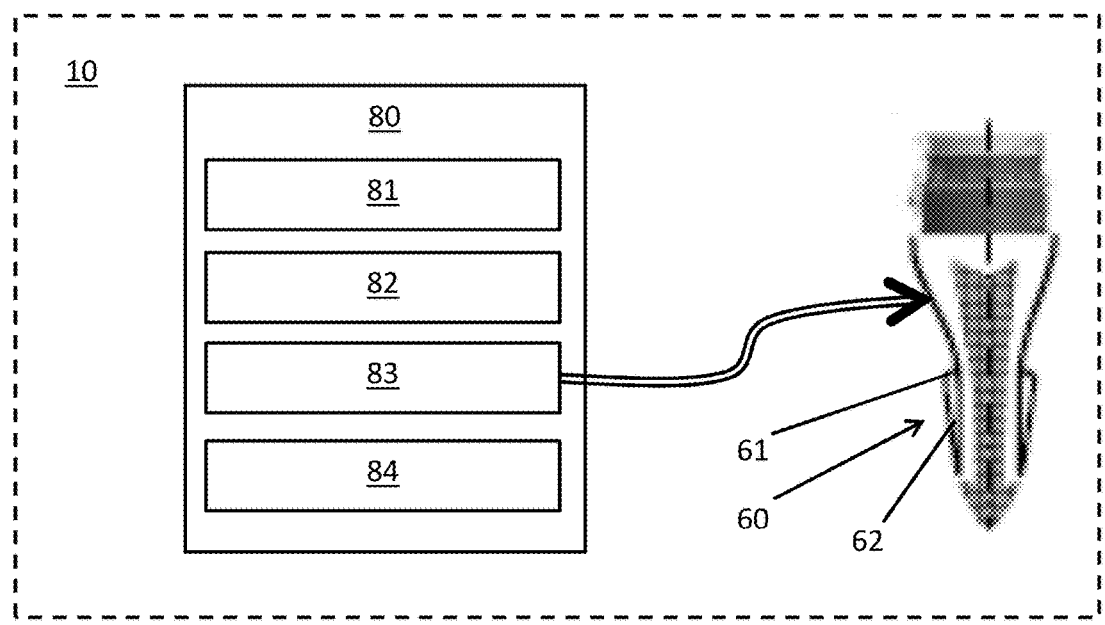
FIG. 7 is a schematic diagram of a control system of the aircraft of FIGS. 1 and 2 in accordance with embodiments.

With reference to FIG. 7, the aircraft 10 may further include a control system 80. The control system 80 includes a processing unit 81, memory 82, servo controllers 83 and sensors 84. The servo controllers 83 are coupled to the exhaust deflectors 62 and are configured to control the exhaust deflectors to assume at least the first, second and third configurations described above. The sensors 84 are disposed to monitor an angling of the exhaust deflectors 62 and to issue to the processing unit a sensor signal that is reflective of that angling. The memory 82 has executable instructions stored thereon, which, when executed, cause the processing unit to execute an exhaust deflector control algorithm. In accordance with embodiments, the exhaust deflector control algorithm may include determining a flight condition currently in effect, calculating a target angling for each of the exhaust deflectors 62, issuing a command signal to the servo controllers 83 to drive a pivoting of the exhaust deflectors 62 in accordance with the target angling and judging from the sensing signal whether the command signal needs to be modified.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vertical take-off and landing (VTOL) aircraft, comprising:
   a fuselage with first and second wings extending outwardly from opposite sides of the fuselage;
   a first nacelle having a first proprotor disposed on the first wing and a second nacelle having a second proprotor disposed on the second wing, the first nacelle having a first trailing end and the second nacelle having a second trailing end, the proprotors being rotatable to generate lift in vertical flight and thrust in horizontal flight;
   a first alighting element extending from rearwardly from a distal end of the first wing and a second alighting element extending rearwardly from a distal end of the second wing, the first and second alighting elements being disposed to support the aircraft in a ground operational condition; and
   a first plurality of exhaust deflectors pivotally mounted to the first trailing end and a second plurality of exhaust deflectors mounted to the second trailing end, each of the first plurality of exhaust deflectors and the second plurality of exhaust deflectors being disposed to assume at least a first configuration, a second configuration, and a third configuration associated with corresponding ones of a first flight condition, a second flight condition, and a third flight condition.

2. The VTOL aircraft according to claim 1, further comprising: a third alighting element extending rearwardly from the first nacelle and a fourth aligning element extending rearwardly from the second nacelle, the third and fourth alighting elements being disposed to support the aircraft in a ground operational condition.

3. The VTOL aircraft according to claim 1, wherein the first and second wings respectively comprise:
   first and second wing portions extending outwardly from the opposite sides of the fuselage; and
   first and second swept winglets extending outwardly from and forming obtuse angles with the first and second wing portions.

4. The VTOL aircraft according to claim 1, wherein each of the first and second nacelles comprise primary exhaust ducts at corresponding ones of the first and second trailing ends and each of the first plurality of exhaust deflectors and the second plurality of exhaust deflectors comprise:
   hinges disposed at trailing edges of each of the primary exhaust ducts; and
   first and second deflector flaps coupled to each of the primary exhaust ducts via the hinges such that the first and second deflector flaps are pivotable about the trailing edges of the primary exhaust ducts.

5. The VTOL aircraft according to claim 4, wherein the first and second deflector flaps are disposed in parallel.

6. The VTOL aircraft according to claim 4, wherein the first and second deflector flaps are independently pivotable.

7. The VTOL aircraft according to claim 4, wherein the first and second deflector flaps each comprise a Coanda deflector.

8. The VTOL aircraft according to claim 1, wherein:
   the first flight condition comprises ground operations, the second flight condition comprises vertical take-off, hover and landing operations and the third flight condition comprises high speed flight, and
   the first configuration comprises a deflecting configuration, the second configuration comprises a divergent-to-neutral configuration and the third configuration comprises a neutral-to-convergent configuration.

9. A vertical take-off and landing (VTOL) aircraft, comprising:
   a fuselage with first and second wings extending outwardly from opposite sides of the fuselage;
   a first nacelle having a first proprotor disposed on the first wing and a second nacelle having a second proprotor disposed on the second wing, the first nacelle having a first trailing end and the second nacelle having a second trailing end, the proprotors being rotatable to generate lift in vertical flight and thrust in horizontal flight;
   a first alighting element extending from rearwardly from a distal end of the first wing and a second alighting element extending rearwardly from a distal end of the second wing, the first and second alighting elements being disposed to support the aircraft in a ground operational condition;
   a first plurality of exhaust deflectors pivotally mounted to the trailing end of the first nacelle and a second plurality of exhaust deflectors pivotally mounted to the trailing end of the second nacelle; and
   a control system coupled to the exhaust deflectors and configured to control the first plurality of exhaust deflectors and the second plurality of exhaust deflectors to assume at least a first configuration, a second configuration, and a third configuration associated with corresponding ones of a first flight condition, a second flight condition, and a third flight condition.

10. The VTOL aircraft according to claim 9, further comprising: a third alighting element extending rearwardly from the first nacelle and a fourth aligning element extending rearwardly from the second nacelle, the third and fourth alighting elements being disposed to support the aircraft in a ground operational condition.

11. The VTOL aircraft according to claim 9, wherein the first and second wings respectively comprise:
   first and second wing portions extending outwardly from the opposite sides of the fuselage; and
   first and second swept winglets extending outwardly from and forming obtuse angles with respective distal tips of the first and second wing portions.

12. The VTOL aircraft according to claim 9, wherein each of the first and second nacelles comprise primary exhaust ducts at corresponding ones of the first and second trailing ends and each of the first plurality of exhaust deflectors and the second plurality of exhaust deflectors comprise:
   hinges disposed at trailing edges of each of the primary exhaust ducts; and
   first and second deflector flaps coupled to each of the primary exhaust ducts via the hinges such that the first and second deflector flaps are independently pivotable about the trailing edges of the primary exhaust ducts.

13. The VTOL aircraft according to claim 12, wherein the first and second deflector flaps are disposed in parallel.

14. The VTOL aircraft according to claim 12, wherein the first and second deflector flaps each comprise a Coanda deflector.

15. The VTOL aircraft according to claim 9, wherein:
the first flight condition comprises ground operations, the second flight condition comprises vertical take-off, hover and landing operations and the third flight condition comprises high speed flight, and
the first configuration comprises a deflecting configuration, the second configuration comprises a divergent-to-neutral configuration and the third configuration comprises a neutral-to-convergent configuration.

* * * * *